Oct. 28, 1952 — R. NIVA — 2,615,743

FASTENING DEVICE

Filed Sept. 6, 1949

INVENTOR.
Russell Niva
BY
Thiess, Olson & Mecklenburger
Attys

Patented Oct. 28, 1952

2,615,743

UNITED STATES PATENT OFFICE 2,615,743

FASTENING DEVICE

Russell Niva, Waukegan, Ill.

Application September 6, 1949, Serial No. 114,233

6 Claims. (Cl. 292—128)

This invention relates to a fastening device which is particularly adapted for use in connection with boxes, luggage, and other apparatus in which two relatively rigid members are pivoted or otherwise arranged to move in fixed paths relative to each other. It is an object of the invention to provide an improved fastening device of that character.

According to one embodiment of the invention, two interlocking hooks are provided one of which is pivotable between an engaging or locking position and an open position, and which is normally urged resiliently toward its engaging position by a spring. When the pivotable member is in its open position, it may be slid into a locked open position in which it is held against the action of the spring. A simple twist of the pivotable member releases the latter from its locked open position whereupon it is free to move to its engaging position under the influence of the spring. When the pivotable member is in its locked open position, it may be slid further to a position entirely free of its supporting member for ready assembly and disassembly.

Accordingly, it is another object of the invention to provide a fastening device which is readily movable between an engaging and an open condition and which may readily be locked in its open position.

It is another object of the invention to provide a fastening device having a pair of interlocking members, one of which is pivotable in a support, the pivotable member being readily removable from or insertable into its support.

It is another object of the invention to provide a fastening device having the advantages described above while being simple in design, rugged in construction, and economical to manufacture.

The invention, together with further objects and advantages thereof, will best be understood by reference to the following description taken in connection with the accompanying drawing, and its scope will be pointed out in the appended claims.

In the drawing, in which like parts are indicated by like reference numerals:

Figure 1:
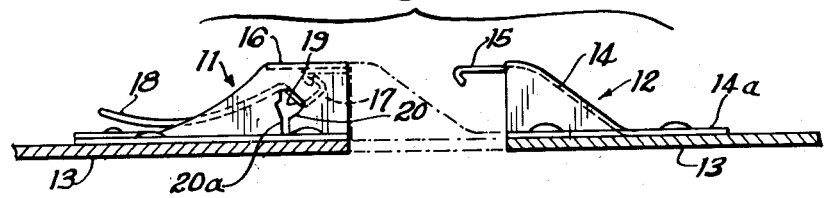
Fig. 1 is an elevational view of a fastening device constructed in accordance with one embodiment of the invention.

In the embodiment illustrated, the fastening device consists of two relatively movable members 11 and 12 mounted on adjoining but relatively movable portions 13 of a box or suitcase. The member 12 consists of a support 14, secured to the box 13 by a flange 14a, and a laterally extending hook 15, the hook extending toward the member 11 and being adapted to be engaged thereby. The member 11 includes a housing 16 and a hook 17 pivotable therein. This hook has a handle 18, curved for convenience in manipulation, and has a pair of outwardly extending ears 19 adapted to pivot in a pair of openings 20 in the side walls of the housing 16. A spring 21 is provided for urging the hook 17 in the counterclockwise direction as viewed in Figs. 1, 3 and 4.

Figure 3:
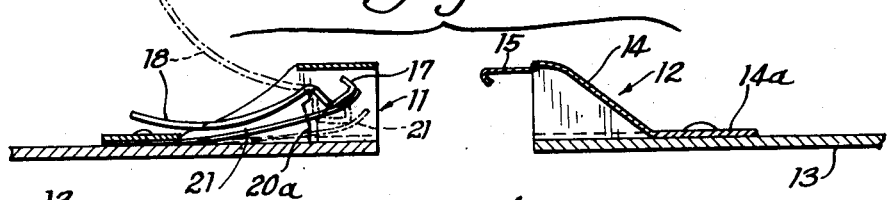
Fig. 3 is a cross-sectional view of the same device taken along the line 3—3 of Fig. 2.
Figure 4:
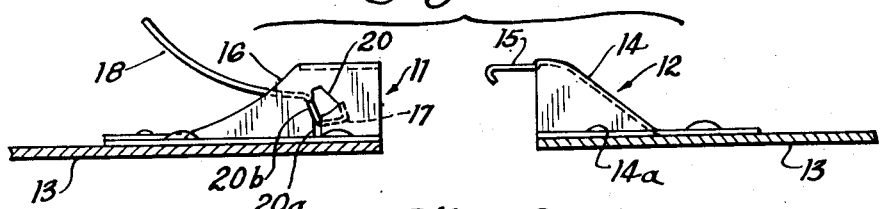
Fig. 4 is an elevational view similar to Fig. 1 but showing the fastening device in a different operating position.

When the hook 17 is in the position illustrated in Fig. 1 and by the solid lines in Fig. 3, it is in position to engage the hook 15 and lock the two portions of the box 13 together, as illustrated by the dotted lines in Fig. 1. The interlocking of the two hook members can be interrupted by raising the handle 18 which causes the hook 17 to pivot downwardly about the upper edge of the ears 19. This open position of the hook 17 is illustrated by the dotted lines in Fig. 3. When the pivoting hook has reached this position, the fixed hook 15 may, of course, be withdrawn therefrom and the box 13 may be opened.

As will readily be understood upon reference to Fig. 3, the spring 21 continues to urge the hook 17 upwardly when the hook is in the open position, illustrated by the dotted lines in Fig. 3. Accordingly, as soon as the handle 18 is released, the hook 17 will again rise and reassume its engaging position, the hook again pivoting about the upper edges of the ears 19.

When the box 13 is to be closed, the handle 18 can be raised to admit the hook 15, or the latter hook can be forced between the upper sloping surface of the hook 17 and the upper wall of the housing 16, the wedge-shaped forward portion of the hook 15 forcing the hook 17 downwardly to permit entrance of the hook 15. As soon as the tip of the hook 15 has passed the tip of the hook 17, the latter hook will rise to its engaging position under the influence of the spring 21, the two hooks 15 and 17 again becoming interlocked to prevent the opening of the box 13 until the handle 18 is again raised.

Frequently, it is desirable to lock the fastener in its open position in order that the box 13, with which it is associated, may be readily opened and closed without the necessity of operating the fastener. When this is desired, the handle 18 is first raised to move the hook 17 to its full open position. In this position the ears 19 are aligned with slots 20a which form extensions of the openings 20, and a downward pressure on the handle will then force the ears into these slots against the action of the spring 21.

After the ears 19 have moved a short distance into the slots 20a, the upper edges of the ears may be moved rearwardly or to the left into offset portions 20b of the openings 20. Since the lower edges of the ears 19 are then maintained in close contact with the walls of the slots 20a, the hook 17 is in its locked open position and is restrained from rotation to its engaging position.

When it is desired to release the hook 17 so that it may again rise to the locking position illustrated in Fig. 1, the handle 18 is merely raised a small amount whereby the upper edges of the ears 19 slip out of the offset portions 20b of the openings 20 and are forced upwardly to their original bearing points by the spring, whereupon the lower edges of the ears move out of the slots 20a and are free to be moved in the counterclockwise direction by the spring 21 as previously described.

Figure 2:
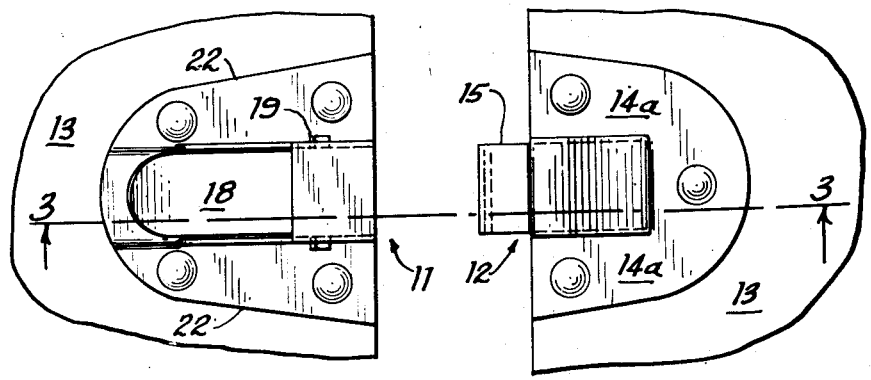
Fig. 2 is a plan view of the same fastening device.
Figure 5:
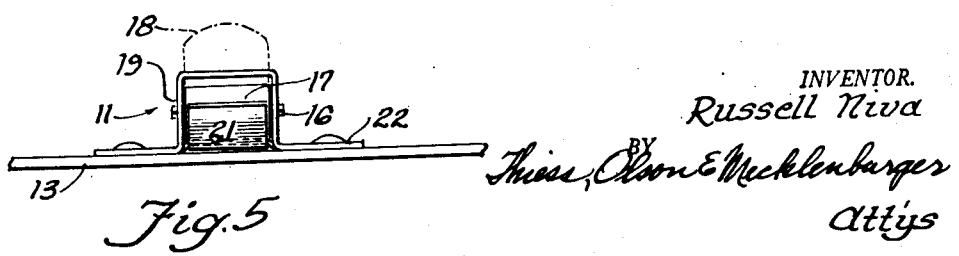
Fig. 5 is a front-elevational view of one portion of the same fastening device.

The slots 20a extend downwardly through the side walls of the housing 16 in order that the entire hook 17 may be readily removed from or assembled with its housing. However, as may readily be seen in Fig. 2, the ears 19 extend outwardly beyond the outer surface of the walls of the housing 16 in order to insure their proper engagement therewith, and, accordingly, these ears must pass through the space properly occupied by a pair of flanges 22 which form a part of the housing 16 and serve to secure the locking member 11 to the box 13. For this reason, the slots 20a continue beyond the lower edges of the walls of the housing 16 and latterly into the flanges 22. Accordingly, when the ears 19 are aligned with the slots 20a the hook 17 can be forced downwarly until the ears 19 pass out through the slots after which the hook can be completely separated from the housing 16 by grasping the hook 17 and withdrawing the handle portion 18 from the housing.

This removal of the hook 17 from the housing cannot, of course, be accomplished when the housing 16 is secured to a continuous portion of a box. In order to effect this removal, the housing 16 must first be removed from the box 13 or an opening must be provided in the box immediately below the fastener member 11 to permit the passage of the hook 17 therethrough.

The purpose of this arrangement is primarily to permit the ready assembly of the fastening member 11 after the manufacture of the parts thereof has been completed but is also desirable in that it permits ready disassembly and reassembly in the event of a breakage of either the housing or the hook.

A fastener constructed as described above has combined therein many substantial advantages. The fastener is opened by a simple lifting of the handle 18 and may be interlocked by merely forcing the fastener members 11 and 12 together. The fastener may be locked in its open position by a simple raising and twisting of the handle 18 and may be returned to its operative position by a further raising of the handle. The pivoting hook 17 along with its handle 18 may be manufactured separate of the housing 16 and readily assembled therewith by merely forcing the handle 18 between the spring 21 and the upper wall of the housing 16, and guiding the ears 19 into the slots 20a. The hook 17 may be readily removed from the housing by moving the hook to its locked open position and forcing the hook a short distance further downwardly. The simple design of the fastener lends itself to a rugged and economical construction.

It will be apparent that a lock can readily be applied for locking the fastener in its engaging position. Such a lock could operate directly against the pivotable hook 17 or against the handle portion 18.

While a particular embodiment of the invention has been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a fastening device for releasably holding together two relatively movable members and having first and second elements engageable with each other and secured one to each of the two relatively movable members respectively, a base element secured to one of said members and having walls opposite one another for supporting said first element, said walls having opposite openings therein and opposite slots which form extensions of the openings, said first element being pivotable with respect to said base element between an engaging position and an open position about a pair of ears rigidly connected to said first element, each of said ears extending through one of said openings in said base element, the edges of said base element forming one portion of each of said openings being shaped to provide an inside corner serving as a bearing for a first edge of one of said ears, the edges of said base element forming the opposite side of each of said openings being concavely arcuate to form a guide for a second edge of said one of said ears, said second edge of said one ear being insertable into the slot forming an extension of said opening when said first element is in said open position, and said first edge of said one ear withdrawing from said corner when said second edge of said one ear enters said slot.

2. In a fastening device for releasably holding together two relatively movable members and having first and second elements engageable with each other and secured one to each of the two relatively movable members respectively, a base element secured to one of said members and having walls opposite one another for supporting said first element, said walls having opposite openings therein and opposite slots which form extensions of the openings, said first element being pivotable with respect to said base element between an engaging position and an open position about a pair of ears rigidly connected to said first element, each of said ears extending through one of said openings in said base element, the edges of said base element forming one portion of each of said openings being shaped to provide an inside corner serving as a bearing for a first edge of one of said ears, the edges of said base element forming the opposite side of each of said openings being concavely arcuate to form a guide for a second edge of said one of said ears, said second edge of said one ear being insertable into the slot forming an extension of said opening when said first element is in said open position, and said first edge of said one ear withdrawing from said corner when said second edge of said one ear enters said slot, said edges of said base element adjacent said inside corner being shaped to provide a step engageable by said first edge of said one ear when said second edge of said one ear is inserted into said slot forming an extension of said opening, engagement of said first edge of said one ear with said step serving to retain said second edge in said slot.

3. In a fastening device for releasably holding together two relatively movable members and having first and second elements engageable with each other and secured one to each of the two relatively movable members respectively, a spring, a base element secured to one of said members and having walls opposite one another for supporting said first element, said walls having opposite openings therein and opposite slots which form extensions of the openings, said first element being pivotable with respect to said base element between an engaging position and an open position about a pair of ears rigidly connected to said first element, each of said ears extending through one of said openings in said base element, the edges of said base element forming one portion of each of said openings being shaped to provide an inside corner serving as a bearing for a first edge of one of said ears, the edges of said base element forming the opposite side of each of said openings being concavely arcuate to form a guide for a second edge of said one of said ears, said second edge of said one ear being insertable into the slot forming an extension of said opening against the urging of said spring when said first element is in said open position, and said first edge of said one ear widthdrawing from said corner when said second edge of said one ear enters said slot.

4. In a fastening device for releasably holding together two relatively movable members and having first and second elements engageable with each other and secured one to each of the two relatively movable members respectively, a spring, a base element secured to one of said members and having walls opposite one another for supporting said first element, said walls having opposite openings therein and opposite slots which form extensions of the openings, said first element being pivotable with respect to said base element between an engaging position and an open position about a pair of ears rigidly connected to said first element, each of said ears extending through one of said openings in said base element, the edges of said base element forming one portion of each of said openings being shaped to provide an inside corner serving as a bearing for a first edge of one of said ears, the edges of said base element forming the opposite side of each of said openings being concavely arcuate to form a guide for a second edge of said one of said ears, said second edge of said one ear being insertable into the slot forming an extension of said opening against the urging of said spring when said first element is in said open position, and said first edge of said one ear withdrawing from said corner when said second edge of said one ear enters said slot, said edges of said base element adjacent said inside corner being shaped to provide a step engageably by said first edge of said one ear when said second edge of said one ear is inserted into said slot forming an extension of said opening, engagement of said first edge of said one ear with said step serving to retain said second edge in said slot against the urging of said spring, said first element being locked in said open position when said second edges of said ears enter said slots.

5. In a fastening device for releasably holding together two relatively movable members and having first and second elements engageable with each other and secured one to each of the two relatively movable members respectively, a base element secured to one of said members and having walls opposite one another for supporting said first element, said walls having opposite openings therein and opposite slots which form extensions of the openings, said first element being pivotable with respect to said base element between an engaging position and an open position about a pair of ears rigidly connected to said first element, each of said ears extending through one of said openings in said base element, the edges of said base element forming one portion of each of said openings being shaped to provide an inside corner serving as a bearing for a first edge of one of said ears, the edges of said base element forming the opposite side of each of said openings being concavely arcuate to form a guide for a second edge of said one of said ears, said second edge of said one ear being insertable into the slot forming an extension of said opening when said first element is in said open position, and said first edge of said one ear withdrawing from said corner when said second edge of said one ear enters said slot, said slots extending from said openings to the edges of said walls and said ears being slidable entirely through said slots whereby said first element may readily be separated from and assembled with said base element.

6. In a fastening device for releasably holding together two relatively movable members and having first and second elements engageable with each other and secured one to each of the two relatively movable members respectively, a spring, a base element secured to one of said members and having walls opposite one another for supporting said first element, said walls having opposite openings therein and opposite slots which form extensions of the openings, said first element being pivotable with respect to said base element between an engaging position and an open position about a pair of ears rigidly connected to said first element, each of said ears extending through one of said openings in said base element, the edges of said base element forming one portion of each of said openings being shaped to provide an inside corner serving as a bearing for a first edge of one of said ears, the edges of said base element forming the opposite side of each of said openings being concavely arcuate to form a guide for a second edge of said one of said ears, said second edge of said one ear being insertable into the slot forming an extension of said opening against the urging of said spring when said first element is in said open position, and said first edge of said one ear withdrawing from said corner when said second edge of said one ear enters said slot, said edges of said base element adjacent said inside corner being shaped to provide a step engageable by said first edge of said one ear when said second edge of said one ear is inserted into said slot forming an extension of said opening, engagement of said first edge of said one ear with said step serving to retain said second edge in said slot against the urging of said spring, said first element being locked in said open position when said second edges of said ears enter said slots, said slots extending from said openings to the edges of said walls and said ears being slidable entirely through said slots whereby said first element may readily be separated from and assembled with said base element.

RUSSELL NIVA.

REFERENCES CITED

The following references are of record in the file of this patent:

UNITED STATES PATENTS

| Number | Name | Date |
| --- | --- | --- |
| 332,004 | Rivers | Dec. 8, 1885 |
| 498,472 | Hunter | May 30, 1893 |